US008764543B2

(12) United States Patent
Houle et al.

(10) Patent No.: US 8,764,543 B2

(45) Date of Patent: Jul. 1, 2014

(54) METHOD AND SYSTEM FOR PLAYING A NETWORKED BINGO GAME

(76) Inventors: Steve Houle, Drummondville (CA); Gerald Duhamel, Drummondville (CA)

( * ) Notice: Subject to any disclaimer, the term of this patent is extended or adjusted under 35 U.S.C. 154(b) by 1576 days.

(21) Appl. No.: 11/505,283

(22) Filed: Aug. 17, 2006

(65) Prior Publication Data

US 2007/0135205 A1 Jun. 14, 2007

Related U.S. Application Data

(60) Provisional application No. 60/708,594, filed on Aug. 17, 2005.

(51) Int. Cl.

| | |
|---|---|
| ***A63F 9/00*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ............ *G07F 17/3272* (2013.01); *G07F 17/32* (2013.01); *G07F 17/329* (2013.01)

USPC ............................................................ 463/19

(58) Field of Classification Search

USPC ............................................................ 463/19

See application file for complete search history.

(56) References Cited

U.S. PATENT DOCUMENTS 4,332,389 A 6/1982 Loyd et al.
4,475,157 A 10/1984 Bolan
5,935,002 A 8/1999 Falciglia
6,099,407 A 8/2000 Parker, Jr. et al.
6,186,892 B1 2/2001 Frank et al.
6,257,980 B1 7/2001 Santini, Jr.
6,280,325 B1 8/2001 Fisk
6,354,941 B2 3/2002 Miller et al.
6,398,645 B1 * 6/2002 Yoseloff .......................... 463/19
6,482,088 B2 11/2002 Santini, Jr.
6,565,091 B2 5/2003 Weingardr
6,569,017 B2 5/2003 Enzminger et al.
6,581,935 B1 6/2003 Odom
6,585,590 B2 7/2003 Malone
6,656,044 B1 12/2003 Lewis
6,692,354 B2 2/2004 Tracy et al.
6,755,738 B2 6/2004 Glasson et al.
6,780,108 B1 8/2004 Luciano et al.
7,666,084 B2 * 2/2010 Herrmann et al. .............. 463/19
2002/0094860 A1 7/2002 Itkis et al.
2002/0117803 A1 8/2002 Weingardt
2002/0149152 A1 10/2002 Taylor
2002/0177478 A1 11/2002 Glasson et al.
2003/0144050 A1 7/2003 Keaton et al.
2003/0178771 A1 9/2003 Banyai
2003/0195032 A1 10/2003 Enzminger et al.
2003/0203750 A1 10/2003 Falciglia (Continued)

*Primary Examiner* — Omkar Deodhar
*Assistant Examiner* — Reginald Renwick
(74) *Attorney, Agent, or Firm* — Benoît & Côté Inc.

(57) ABSTRACT

Embodiments of the present invention provide methods, systems and programs for conducting a game of bingo, comprising an enrollment process in which at least one player enrolls to join a team of players to participate in the bingo game. Virtual players may be generated to join the team of players. Bingo indicia are drawn and compared to the players' (participating or virtual) bingo cards and an ending process is triggered when an ending pattern is formed on a bingo card.

37 Claims, 9 Drawing Sheets

(56) References Cited

U.S. PATENT DOCUMENTS

| | | | | |
|---|---|---|---|---|
| 2004/0009806 | A1 | 1/2004 | Odom | |
| 2004/0152505 | A1 | 8/2004 | Herrmann et al. | |
| 2005/0059467 | A1 | 3/2005 | Saffari et al. | |
| 2005/0059468 | A1 | 3/2005 | Canon | |
| 2005/0059469 | A1 | 3/2005 | Gail et al. | |
| 2005/0059470 | A1 | 3/2005 | Cannon | |
| 2005/0059471 | A1 | 3/2005 | Cannon | |
| 2005/0064932 | A1 * | 3/2005 | Cannon | 463/19 |
| 2005/0075161 | A1 | 4/2005 | McGlone et al. | |
| 2005/0119042 | A1 | 6/2005 | Chamberlain et al. | |
| 2006/0211483 | A1 | 9/2006 | Padgett | |

* cited by examiner

| Players (120) | 5% (122) | 95% (124) | Average (126) |
|---|---|---|---|
| 1 | 52,68 | 74,53 | 67,56 |
| 2 | 48,68 | 72,80 | 62,98 |
| 5 | 43,84 | 68,26 | 58,35 |
| 10 | 40,51 | 63,91 | 54,17 |
| 15 | 38,69 | 61,29 | 51,81 |
| 20 | 37,45 | 59,43 | 50,18 |
| 25 | 36,52 | 57,96 | 48,94 |

5% represents the number of numbers drawn, so 5% of the games present at least one card with the monitored daubed spots 95% represents the number of numbers drawn, so 95% of the games present at least one card with the monitored daubed spots Average represents the average number of numbers drawn, according to their probability weight, so at least one card has the monitored daubed spots

Figure 8

132 122 124 126

| Pattern spots | 5% | 95% | Average |
|---|---|---|---|
| 2 | 4,87 | 32,22 | 17,54 |
| 4 | 19,28 | 49,48 | 35,52 |
| 8 | 38,69 | 61,29 | 51,81 |
| 10 | 44,49 | 63,95 | 56,01 |
| 12 | 48,86 | 65,83 | 59,04 |
| 24 | 61,76 | 70,77 | 67,43 |
| 25 | 62,33 | 70,93 | 67,78 |

| | |
|---|---|
| 5% | represents the number of numbers drawn, so 5% of the games present at least one card with the monitored daubed spots |
| 95% | represents the number of numbers drawn, so 95% of the games present at least one card with the monitored daubed spots |
| Average | represents the average number of numbers drawn, according to their probability weight, so at least one card has the monitored daubed spots |

Figure 9

METHOD AND SYSTEM FOR PLAYING A NETWORKED BINGO GAME

CROSS-REFERENCE TO RELATED APPLICATIONS

This application claims priority under 35US§119(e) of U.S. provisional patent application 60/708,594, filed on Aug. 17, 2005, the specification of which is hereby incorporated by reference.

SUMMARY OF THE INVENTION

An embodiment of the present invention provides a method of conducting a game of bingo, comprising: conducting an enrolment process in which at least one player enrolls to participate in the bingo game and evaluating a number of players having enrolled in view of a minimal number of players in a team of players. If the number of players having enrolled is lower than the minimal number of players, at least one virtual player is generated and added to the team of players. At least one bingo card bearing indicia is registered for each player or virtual player in the team of players; each of the at least one bingo card is unique. Bingo indicia are drawn and compared to the bingo cards, and an ending process is triggered when an ending pattern is formed on a bingo card.

Another embodiment of the invention provides a method of conducting a game of bingo, comprising: conducting an enrolment process in which at least one player enrolls to participate in the bingo game and forming a team of players composed of the at least one player and at least one virtual player. At least one bingo card bearing indicia is registered for each of the at least one player and at least one virtual player; each of the at least one bingo card is unique. Bingo indicia are drawn and compared to the bingo cards, and an ending process is triggered when an ending pattern is formed on a bingo card.

Yet another embodiment of the present invention provides a method of forming a team of players in a bingo game comprising the steps for: providing an enrolment process in which at least one player enroll to participate in the bingo game and evaluating a number of players having enrolled in view of a predetermined minimal number of players in the team of players. If the number of players having enrolled is lower than the minimal number of players, at least one virtual player is generated and added to the team of players.

Another embodiment of the present invention provides a bingo system comprising at least one player station and a bingo server to provide a bingo game. The bingo system comprises: displaying means for displaying the bingo game; communicating means for communicating bingo game information between the at least one player station, the bingo server and any other component of the bingo system; input-receiving means for receiving player input about an enrolment process; and drawing means for drawing bingo indicia. The bingo system also comprises controlling means for controlling: an enrollment process during which at least one player enrolls to participate in said bingo game by joining a team of players comprising a number of virtual players; or a virtual player.

A further embodiment of the present invention provides a computer program embodied on a computer readable medium or in a processor-readable memory having codes adapted to conduct an enrolment process in which at least one player enrolls to participate in a bingo game and to evaluate a number of players having enrolled in view of a minimal number of players in a team of players. If said number of players having enrolled is lower than said minimal number of players, the codes are also adapted to generate at least one virtual player to add to the team of players. The program also has codes adapted to register at least one bingo card bearing indicia for each player or virtual player in the team of players, each of said at least one bingo card being unique; to draw bingo indicia; to compare the drawn bingo indicia to the bingo cards; and to trigger an ending process when an ending pattern is formed on a bingo card.

Yet another embodiment of the present invention provides a computer program embodied on a computer readable medium or in a processor-readable memory having codes adapted to conduct an enrolment process in which at least one player enrolls to participate in a bingo game, to form a team of players composed of the at least one player and at least one virtual player and to register at least one bingo card bearing indicia for each of said at least one player and at least one virtual player, each of said at least one bingo card being unique. The codes are also adapted to draw bingo indicia; compare the drawn bingo indicia to the bingo cards; and to trigger an ending process when an ending pattern is formed on a bingo card.

Another embodiment of the present invention provides a computer program embodied on a computer readable medium or in a processor-readable memory having codes adapted for providing an enrolment process in which at least one player enrolls to participate in a bingo game and evaluating a number of players having enrolled in view of a predetermined minimal number of players in a team of players. If the number of players having enrolled is lower than the predetermined minimal number of players, the codes are adapted for generating at least one virtual player to add in the team of players.

BRIEF DESCRIPTION OF THE DRAWINGS

Further features and advantages of the present invention will become apparent from the following detailed description, taking in combination with the appended drawings, in which:

FIG. 8 is a table of the variation of the number of numbers necessary to form an game-ending pattern according to the number of players participating in a bingo game played accordingly to an embodiment of the present invention; and FIG. 9 is a table of the variation of the number of numbers necessary to form an game-ending pattern according to the number of spots comprised in the game-ending pattern in a bingo game played accordingly to an embodiment of the present invention.

It will be noted that throughout the appended drawings, like features are identified by like reference numerals.

DETAILED DESCRIPTION OF THE EMBODIMENTS OF THE INVENTION

In order to provide a good understanding of the invention, in this application the terms “networked bingo game” mean “a bingo game wherein a plurality of participants compete to win the bingo game by being the first to constitute a game-winning pattern”. In that case, each participant of the bingo game plays through a player terminal communicatively linked to a bingo server.

The terms “enrol” and “enrolment” relate to the action of “player becoming a participant in a bingo game”.

The terms “indicia”, “numbers” and “balls” in the environment of a bingo game all refer to “identifiable elements that are used for playing the game”.

The term “daubing” refers to “any form of marking” suitable for the play of the game. For example, this marking may be automated, may demand a specific process, or may require intervention from the player that, in the end, illustrates a difference of representation between daubed and non-daubed numbers. Thereby, the marking permits the evaluation of an outcome by comparing these markings to a pattern.

The terms “ending pattern” refer to “a particular pattern formed by daubed numbers on a bingo card which, when obtained by a player (participating or virtual), triggers an ending process”.

The terms “game-ending pattern” refer to “a particular pattern formed by daubed numbers on a bingo card which, when obtained by a participating player, ends the game”. In some cases, this may also be referred as “game-winning pattern”.

The terms “participation-ending pattern” refer to “a particular pattern formed by daubed numbers on a bingo card which, when obtained by a player (participating or virtual), ends a participation-prize-distribution phase of the game”.

The terms “winning pattern” refer to “a particular pattern formed by daubed numbers on a bingo card which results in awarding a participation prize”.

Figure 1:
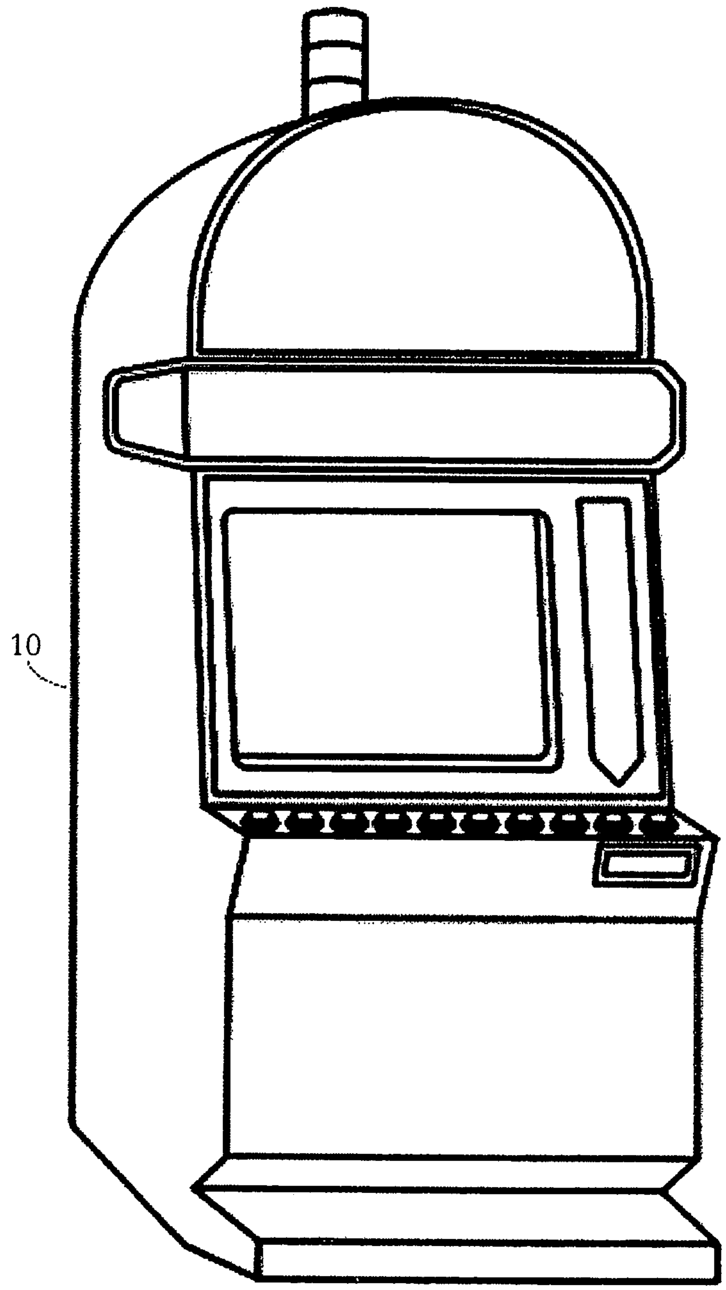
FIG. 1 illustrates a perspective view of a player station suitable for embodiments of the present invention.
Figure 2:
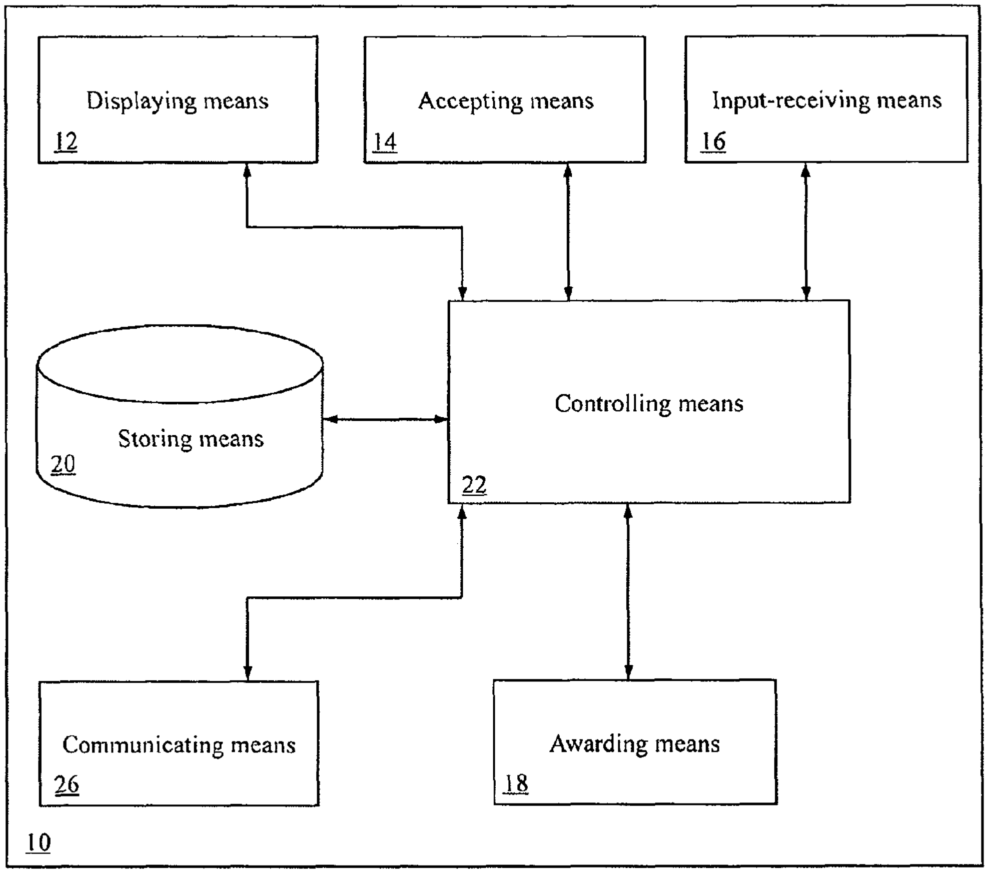
FIG. 2 is a block diagram illustrating the components of the player station of FIG. 1.

An embodiment of the present invention may be carried out in part on a player station, as illustrated on FIGS. 1 and 2. The player station 10 comprises displaying means 12, such as a video screen or a LCD screen; accepting means 14, such as a card reader, a ticket reader, or a coin and/or bill acceptor; input-receiving means 16, such as buttons, levers or a touch screen; awarding means 18, such as a ticket printer, a card reader or a hopper; storing means 20, such as RAM, flash memory, a hard drive or a removable memory medium; and controlling means 22, such as a computer, computer codes, or a hardware controller. Player station 10 comprises communicating means 26, such as a network communication controller and a network connection, or a wireless communication capability. In another embodiment, the player station 10 carrying out the invention may comprise, either in replacement of or in combination with the accepting means 14, communicating means 26 allowing communication between the controlling means 22 and remotely linked accounting means (not shown) wherein player accounts are maintained (either by a casino or by a financial institution, such as a bank), and monetary value is downloaded on the player station 10 to play the game and uploaded on the accounting means upon quitting the game.

Figure 3:
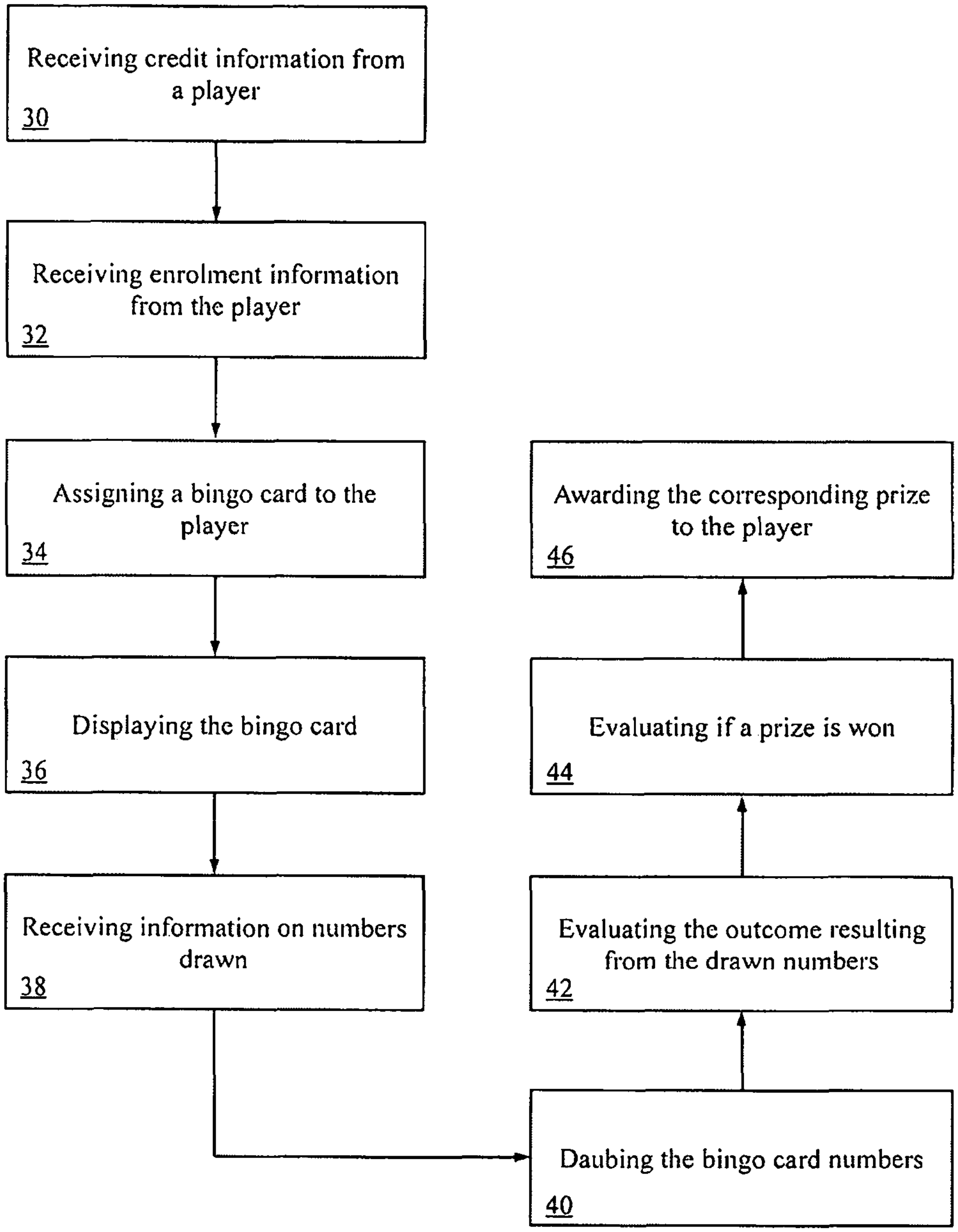
FIG. 3 is a flow chart providing the steps performed by a player station while playing a bingo game according to an embodiment of the present invention.

Such a player station 10 is designated, as shown on FIG. 3, to provide a player with a participation in a networked bingo game. Such a bingo participation involves receiving credit information from a player (at step 30) coming from the deposit of money either in a physical format (such as coins or bills) or in an electronic format (such as money stored on a player card or transfer from a bank account), receiving enrolment information from the player (at step 32), assigning (either by randomly generating or selecting the bingo card, or allowing the player to select his bingo card) (at step 34) and displaying (at step 36) the bingo card on the player station. When the enrolment period is over, the game begins. The game also comprises receiving information on drawn numbers (at step 38). These numbers may be drawn by a component of the player station itself, or they may be drawn elsewhere, such as a bingo blower or a bingo server. The bingo card numbers are then daubed, according to the numbers drawn, either automatically or following a daubing command coming from the player (at step 40). The outcome resulting from the bingo card daubing is evaluated (at step 42), and if the outcome corresponds to a winning outcome (at step 44), the corresponding prize is awarded (at step 46).

Figure 4:
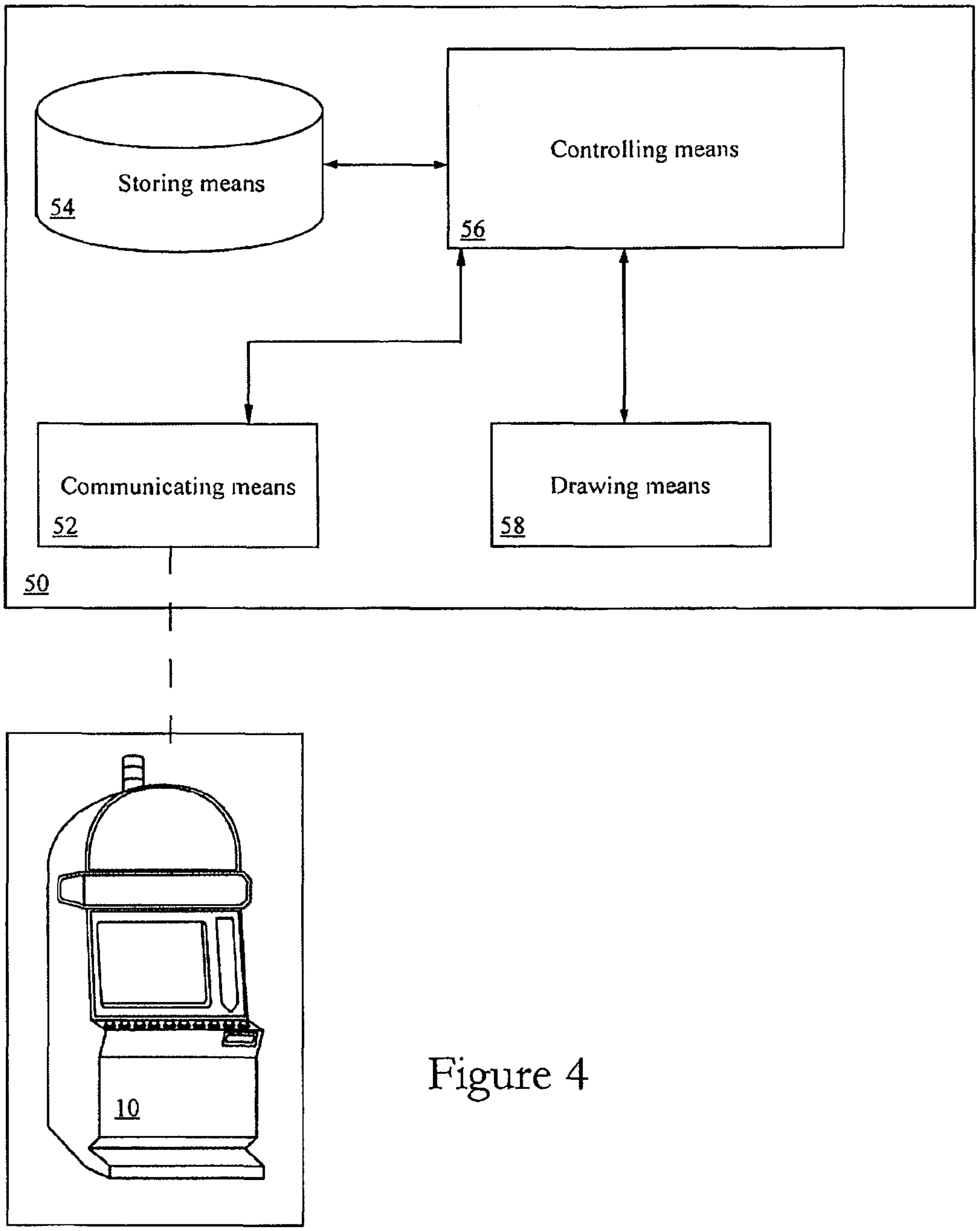
FIG. 4 is a block diagram illustrating the components of an embodiment bingo server communicatively linked to player stations as one illustrated on FIGS. 1 and 2 according to an embodiment of the present invention.

To provide participations in such a bingo game, as shown on FIG. 4, a bingo server 50, communicatively linked to a plurality of player stations 10, comprises: communicating means 52 such as a network communication controller, and a network connection or a wireless communication capability; storing means 54 such as RAM, flash memory, a hard drive or a removable memory medium; controlling means 56 such as a computer, computer codes, or a hardware controller; and drawing means 58 such as computer codes, a physical Random Number Generator like a bingo ball blower and ball detection device, or an electronic Random Number Generator.

Figure 5:
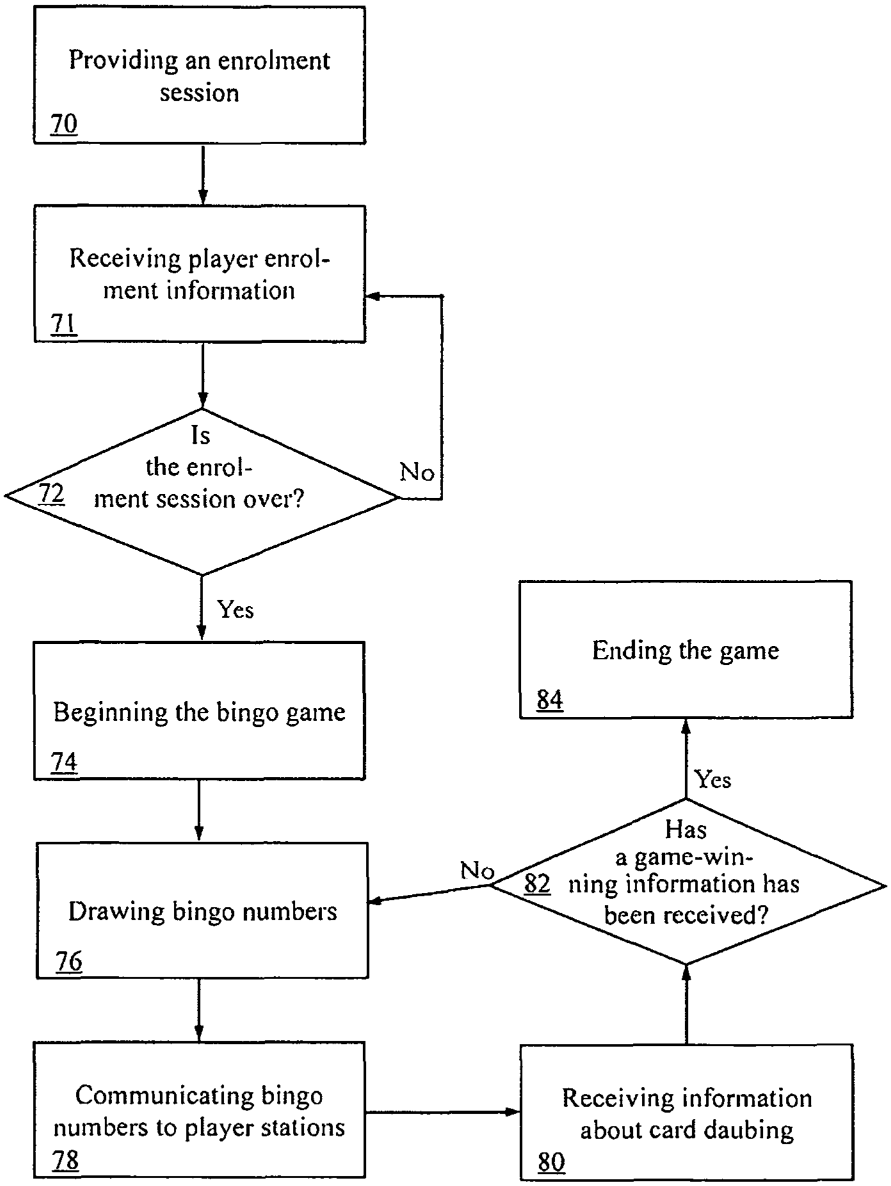
FIG. 5 is a flow chart illustrating the steps performed by a bingo server while playing a bingo game according to an embodiment of the present invention.

A bingo system, comprising at least one player station 10 and a bingo server 50, is adapted to provide a bingo game to a plurality of players, each at a player station, as shown on FIG. 5. To allow players to join the game, an enrolment session is provided (at step 70), during which player enrolment information (for example, wager value, game level, player identification, etc.) is received (at step 71). This enrolment session lasts until a predetermined or variable length of time has elapsed, when a predetermined number of players have enrolled, or when any other criterion is met (at step 72). The length of time allowed for the enrolment session may vary with the moment of the day, the week or with the time elapsed between player enrolments, for example. When the enrolment session ends, the game begins (at step 74). The bingo system is adapted to draw bingo numbers (at step 76), to communicate these drawn bingo numbers to the participating player stations (at step 78), to receive information regarding card daubing from the linked player stations (at step 80), and upon reception of game-winning information from a player station (at step 82), to end the game (at step 84). If no game-winning information is received (at step 82), new bingo numbers are drawn (at step 76).

The enrolment process, through which an enrolment session is provided, may also comprise steps for controlling the number of players to make sure at least a certain number of players have enrolled. If the enrolment session ends and not enough players have enrolled, the game cannot begin and a new enrolment session may be provided, the previously enrolled player(s) having to enrol all over again. A message informing the enrolled player(s) of the situation may be provided.

In some bingo game environment, there are two (2) types of prizes which may be awarded to a player completing bingo patterns. The first one is a game-winning prize, awarded to the first player to complete a specific bingo pattern referred as a game-ending pattern. The second type of prize is a participation prize, and it is awarded to any player who completes a winning pattern (any predetermined pattern associated with a prize outside the game-ending pattern). The awarding of this second type of prize may be limited to a participation-prize-distribution phase which ends when the game ends or when a condition is met. The condition may be outcome related (such as a specific pattern being formed) or not (a predetermined amount of numbers have been drawn, or a specific length of time has elapsed).

Figure 6:
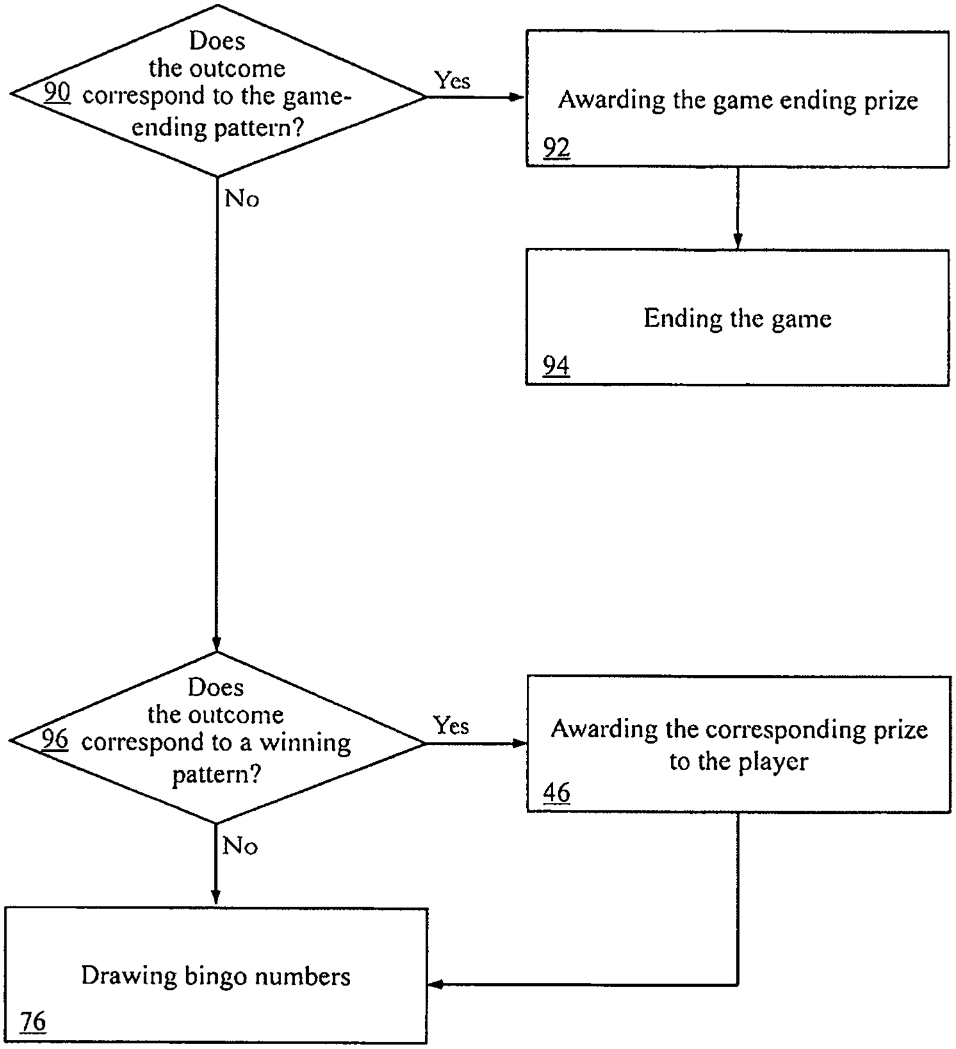
FIG. 6 is a flow chart providing the steps of the evaluation of an outcome according to an embodiment of the present invention.

In such an environment, the evaluation of the outcome resulting from a card daubing (at steps 42 and 44 of FIG. 3) also comprises, as illustrated on FIG. 6, determining whether the outcome corresponds to the game-ending pattern (at step 90). If it is so, the prize for winning the game is awarded (at step 92) and the game ends (step 94). Else, it is determined whether the outcome corresponds to a winning pattern (at step 96). If the answer is positive, the corresponding participation prize is awarded (at step 46), and new numbers are drawn (at step 76 of FIG. 5).

Figure 7:
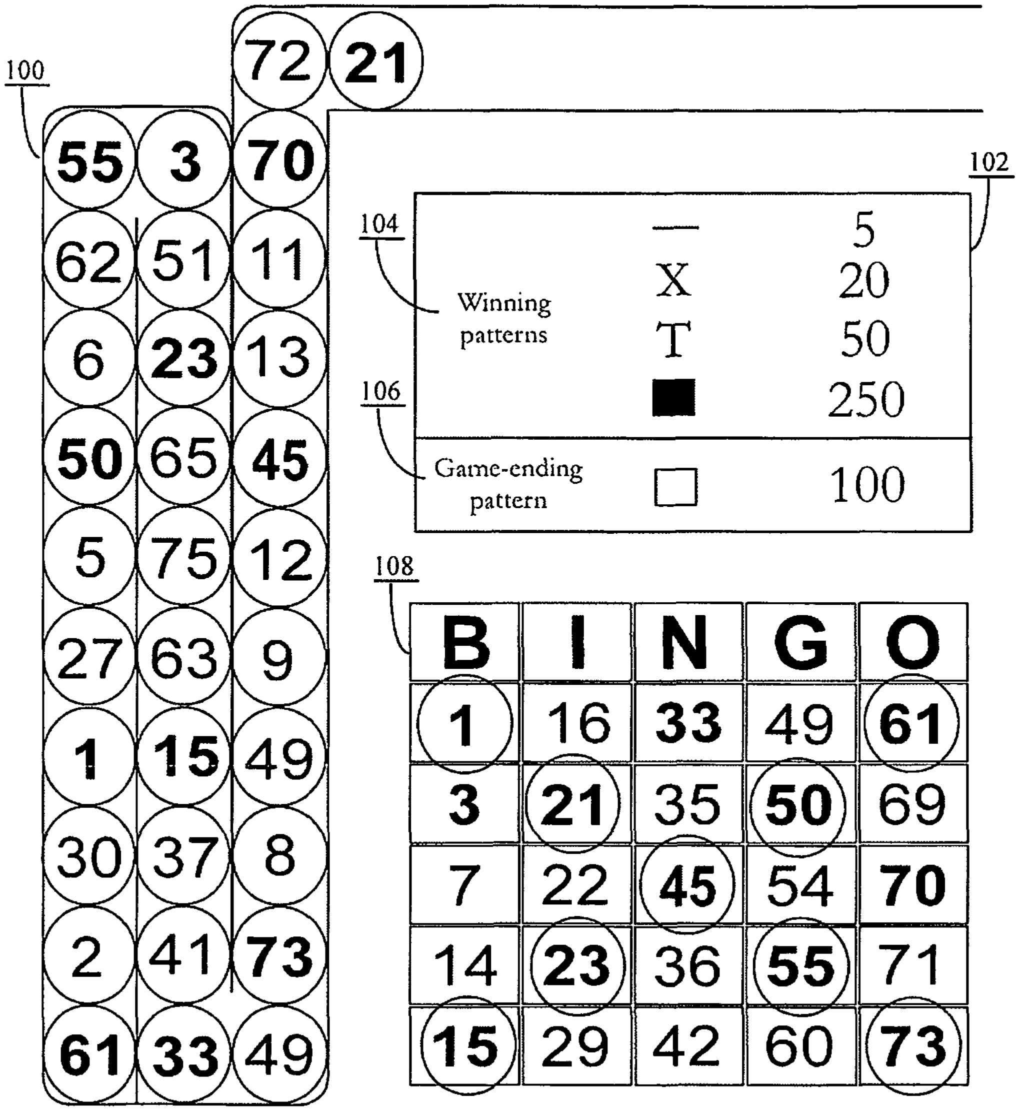
FIG. 7 is a screen shot of a bingo game played accordingly to an embodiment of the present invention.

FIG. 7 is a screen shot of a bingo game wherein numbers have been drawn, the bingo card has been daubed and a winning pattern has been formed. The numbers drawn during the game are herein illustrated as "balls" 100, daubed numbers are marked in bold while the numbers, or spots, participating in the winning pattern, here a X pattern, are circled. A pay table 102 indicates to the player the prize values awarded for forming the winning patterns 104 and/or the game-ending pattern 106. The bingo card itself 108 is a standard bingo card composed of five columns, each being identified with a letter (B, I, N, G, and O), and comprising five (5) cells, each cell bearing a number. The cells of the B column bear numbers ranging from 1 to 15, the cells of the I column bear numbers ranging from 16 to 30, etc. Therefore, a standard bingo card bears twenty-five (25) numbers varying between 1 and 75; or 24 if the cell in the center of the matrix bears no number and is considered as free. This free cell is usually daubed automatically at the beginning of the game. In most examples, descriptions or explanations in this document, the bingo card is a standard 5×5 matrix, with or without a free space. But any game card formed by any number of columns and/or rows, as long as the matrix formed by those rows and columns is at least 2×2, may be used in accordance with embodiments of the present invention.

A real-time networked bingo creates two difficulties. First, since it involves enrolment of players, it is difficult to predict how many players will actually enrol and how fast. Meaning that to offer a faster paced bingo game, the enrolment session should be short, but then, not many players may have time to enrol. Secondly, fewer participants, and thus played bingo cards, mathematically mean more bingo numbers should be drawn, in average, to constitute a winning pattern on at least one of the played bingo cards. If more numbers are drawn, more winning patterns (which at least some are easier to form, because they comprise less spots, than the game-ending pattern) are formed, and thus more participation prizes are awarded. Therefore, to maintain a correct payout, particularly regarding participation prizes, it is essential to determine a way to limit the number of bingo numbers necessary to form an game-ending pattern, or at least control the length of time during which participation prizes are awarded.

Accordingly, the average amount of numbers drawn and distributed before one of the players forms a specific pattern, varies with the environment. FIG. 8 illustrates the variation in the number of numbers necessary to form an eight-spot pattern such as an X pattern on at least one card, when the number of players varies. FIG. 9 also illustrates the variation in the number of numbers necessary to form a pattern on at least one bingo card, but this time, the number of spots comprised in the pattern varies while the number of players, fifteen (15), is constant. These tables provide the average number of numbers 126 necessary to form the pattern as well as the low (5%) 122 and high (95%) 124 limits of the distribution. These numbers are based on theoretical calculations of probabilities in a standard seventy-five-numbers game of bingo wherein not only the number of matching numbers is taken into account but, more importantly, their position so they form a pattern on the 5×5 matrix card. The low limit 122 of the distribution represents the number of numbers necessary to form the pattern on at least a bingo card in five percent (5%) of the games. Meaning that five percent (5%) of the games are theoretically won (the game-ending pattern of eight spots is formed on at least one card) with this number of numbers or less. The same way, the high limit 124, ninety-five percent (95%), represents the number of numbers necessary to end/win ninety-five percent of the games. As can be seen on FIG. 8, raising the number of players 120 lowers both limits and the average number of numbers necessary to form the pattern 126. Accordingly, when only one (1) player tries to form the pattern, over sixty-seven (67) numbers on average are necessary to form a X pattern while about fifty-two (52) would be required for at least one player among fifteen (15) to form the same pattern. Finding the optimal number of players is then a compromise between how hard it is to form teams and the percentage of payout that can be allotted to the participation prizes. Of course, if it is required that more than one player forms the specific pattern to trigger the end of the game or the end of the participation-prize-distribution period, the average amount of drawn numbers required to form these two occurrences of the specific pattern is higher than it is to form only one occurrence.

FIG. 9 illustrates what happens to the average number of numbers necessary to form different patterns on at least one bingo card when fifteen (15) players are in the team. It is rather easy to figure out that if more spots 132 are comprised in the pattern, then more numbers are necessary to form it 122, 124 and 126.

Embodiments of the present invention comprise forming a team of at least a predetermined minimal number of players. Accordingly, when an enrolment session is over, if the enrolled players (referred for the rest of the document as participating players) are not numerous enough to form a team comprising at least the predetermined minimal number of players, the team is completed, up to the predetermined minimal number of players, by adding virtual players. Each of these virtual players has a bingo card which is monitored and daubed automatically by the bingo server or a player station, or any other components of the system. If the predetermined minimal number of players is reached before the end of the enrolment session, the enrolment session may end and the game begins (thus limiting the number of player to the predetermined minimal number of players), or the system may allow more players to enroll and to participate in the game.

To enrol, a player places a wager and at least one bingo card is provided to the player, through player selection or random selection among a predetermined set of cards (which may include all possible bingo cards), or by randomly creating a bingo card on the spot. Each player has a unique bingo card, meaning that a bingo card cannot be distributed to more than one player playing the same bingo game. Also, when a player enrols himself in a bingo game, he may be invited to select a theme, a pay schedule, or one or many customizable parameters influencing either the play or the representation of the game. However, all players regardless of their selections keep playing the same game, thus competing using the same draw to be the first to form the game-ending pattern. As a result, many players participating in the same game may be provided with a list of different available participation prizes, and may be provided with a variety of game representations but they are still competing against each other. Furthermore, the participation-ending pattern may differ based on the selected pay schedule. In this case, the bingo server 50 monitors a plurality of participation-ending patterns, and signals the correct player stations 10 when a participation-ending pattern is constituted on a bingo card of any team participant.

A player may decide to buy more than one bingo card. If the system does not allow this "multi-purchase", the player has only the option of using more than one player station, and thus enrols on as many player stations as the number bingo cards he wants to play. Naturally, the system will consider this player as a plurality of participating players, each taking a place in the team of players. On the other hand, the system may allow the player to purchase more than one bingo card on a single player station. Two situations may then arise: the bingo game is set that way and by buying more than one card the player is only selecting his desired level of play and the player is considered by the system as a single participating player or, the other possibility, the system interprets the number of cards purchased as the number of enrolments in the bingo game. In this situation, if the player purchases two (2) bingo cards, the system considers he has enrolled twice and thus the system adds two participating players to the team.

The numbers may be drawn by the bingo server all at the same time (resulting in randomly ordering all the numbers of the game), one by one, or in sets, whose size may vary from one draw to another. Accordingly, the first draw may comprise three (3) numbers, while the others comprise only one (1) number. If all the numbers are drawn at the same time, at the beginning of the game, they are distributed one by one or in sets, which may also vary in size from one distribution instance to the other. After at least one number has been drawn and distributed, the numbers on the cards are compared to the drawn numbers, and the cards are daubed, meaning the matching numbers are marked differently than the non-matching so they are differentiated. This daubing may be automatically operated by the player station or the bingo server, or done by the players. If the players have to daub their cards, there are many ways to do it, for example by touching a button or any area of the player station screen indicating to the system the player's desire to daub. The system then daubs the cards according to the drawn numbers. Another way would be for the player to touch each spot bearing a number matching a drawn number.

If the player has the responsibility of daubing his card (whether by touching each number or just indicating to the system his desire to daub), the system has to react to the absence of daubing, also known has "sleeping". If a player does not daub his card, he may not win on this turn, but upon the next draw and distribution, he might "wake up" and daub. If this happens, all the non-daubed matching numbers are daubed and, if the game-ending pattern or a winning pattern is formed, the player wins his prize and/or the game. Another embodiment may be to remove the possibility of forming a winning pattern when a player slept without affecting the possibility of forming the game-ending pattern, or vice-versa. Finally, sleeping may also remove all possibilities of winning a prize and/or the game when the card was not daubed, An embodiment of the present invention introduces a participation-ending pattern, which, when formed by a player, participating or virtual, stops the distribution of participation prizes. This provides the participating players with clear rules regarding the conduct of the game, since the game-ending pattern and the winning patterns are known throughout the game, even during the enrolment session. The game length varies, the period during which participation prizes are available varies (they may be available even after the end of the game), but the payout of the game and the rules are known, they do not change regardless of the number of participating players enrolled in the bingo game.

This participation-ending pattern may be identical to the game-ending pattern, in which case, whether the participation-ending pattern/game-ending pattern is formed by a participating player or by a virtual player has a different effect on the game. Effectively, if the participation-ending pattern/game-ending pattern is formed by a participating player, both the game and the participation-prize-distribution phase end, while only the participating-prize-distribution phase ends if a virtual player forms the participating-ending pattern/game-ending pattern, the game continuing until a participating player forms the game-ending pattern. On the other hand, the participation-ending pattern may be different from the game-ending pattern, and then, any player may trigger the end of the participation-prize-distribution phase. With the latter, if the participation-ending pattern has not been formed before a participating player forms the game-ending pattern, the participation-prize-distribution phase may continue after the end of the game, and thus new bingo numbers would be drawn, even after the end of the game.

Example of an Embodiment of the Invention

The following example is set in a very particular game environment, known as Class II bingo game environment, wherein at least two players must compete to win the game. Thus, at least two players must enrol during the enrolment session for the game to begin. This example is not intended to limit in anyway the scope of the present invention and is only provided to illustrate an application of embodiments of the present invention in a regulated and enforced game environment. Accordingly, many of the limitations or particularities of this example would not be necessary in a Class III gaming environment.

Many of the Class II video bingo games are coupled with other game type displays, herein referred as "display-game". For example, a bingo game may be displayed, on the same screen, as a bingo game and as a line game (display-game) to add more entertainment for the player. The display-game outcome being entirely based on the bingo game outcome, it is only a more "fun" way to display a game that may seem static otherwise to some players. Since the display-game is based on the bingo game, the display-game outcome is displayed after the bingo game outcome is determined; meaning after the bingo card has been daubed. If the player "sleeps", no display-game outcome is provided.

When an enrolment session begins, the bingo server 50 signals the beginning of the enrolment session to a plurality of player terminals 10 and a message is displayed on the player station inviting players to join the game. To enrol, the player places a wager, indicates his game theme selection, when available. The player is assigned a unique bingo card bearing indicia, meaning that no other player, participating or virtual, playing the same bingo game receives the same bingo card. A "copy" of the distributed cards may be kept on the bingo server to determine whether patterns may be formed on the cards at each number draw and/or distribution instance. Keeping such copy also allows the bingo server to daub the virtual players bingo cards and to identify the last possible formable game-ending pattern.

At the end of the enrolment session, which occur when a predetermined length of time has elapsed, or when a predetermined number of enrolled players has been reached, for example, it is determined whether enough players (the predetermined minimal number of players) have enrolled. If it is not the case, a message is displayed informing that not enough players have enrolled and that the enrolment session is prolonged or that a new enrolment session will soon begin. If a new enrolment session is provided, the players who had previously enrolled have to enrol again by accepting to participate in the next bingo game, or any other invitation to this effect. In this example, two players are necessary for the game to begin, and four (4) players have enrolled during the enrolment session. At the end of the enrolment session, it is determined whether the predetermined minimal number of players is reached. If not, virtual players are added to complete the team. In this example, the predetermined minimal number of players is fifteen (15), so eleven (11) virtual players join the team. The bingo cards for these virtual players are "played" by the bingo server, a player station or any other component of the bingo system.

At this time, the game begins and a first set of numbers is drawn and distributed to the player stations. This first set comprises at least one number less than the number of spots of the game-ending pattern to comply with Class II regulations. Also, in this environment, the players have to make a decisive action to daub their cards, whether by pushing a button, touching the screen or selecting the matching numbers one at a time, to be able to form a winning or game-ending pattern. The resulting outcome is evaluated and if a display-game is provided, the display-game outcome is mapped on the bingo game outcome and displayed to the player. If a winning pattern is formed by a participating player, the corresponding prize is awarded to the player, and new numbers are drawn and/or distributed, These steps of drawing/distributing numbers, comparing them to the numbers on the bingo cards, daubing, evaluating and awarding are repeated until at least one of the game-ending pattern or the participation-ending pattern is formed. In this example, the participation-ending pattern is identical to the game-ending pattern. If the participation-ending pattern/game-ending pattern is formed by one of the virtual players, the participation-prize-distribution phase ends and no more participation prizes are to be awarded, but the game continues until a participating player forms the participation-ending pattern/game-ending pattern. If the participation-ending pattern/game-ending pattern is formed by a participating player, both the participation-prize-distribution phase and the game ends, and the corresponding prize is awarded to the player.

On the other hand, if the participating player who formed the game-ending pattern "sleeps" they might lose the possibility of winning the game, even if they daub after the next draw/distribution of numbers (according to game rules). In this case, the system would freeze the game if it is determined that the player is the last player who has the possibility of forming the game-ending pattern, and thus until the card is manually or automatically daubed. The unclaimed game-winning prize would then be put into a progressive jackpot.

If more than one player form the game-ending pattern on the same draw, the fastest player to daub their card may determine the winner of the game. Other means may also be used to determine a winner, such as drawing a random number, or comparing the number of matching numbers on their cards (even those not participating in any winning or game-ending patterns), for example. Accordingly, more than one player may form a winning pattern at the same time, but there might be only one winner of the game. Drawing and distributing smaller sets of numbers may also help to determine a unique winner of the game.

Another Example of an Embodiment of the Invention

This example is also set in a Class II environment.

At the end of the enrolment session, the bingo cards of all participating and virtual players are stored on a bingo server. A first draw of numbers, comprising at least one number less than the number of spots in the game-ending pattern, is operated by the bingo server, and distributed to the player stations. The drawn numbers are compared to the numbers on the bingo cards and the bingo cards are daubed by the bingo server. A new number is drawn by the bingo server and compared to the numbers on the cards. If a winning pattern or the game-ending pattern may be formed, the number is distributed to the player station and the players daub their cards. If no pattern is formed, a new number is drawn. New numbers are drawn until a winning pattern or the game-ending pattern may be formed, upon which all the numbers drawn since the last distribution are sent to the player stations, and played by the players. The same steps are repeated until the game-ending pattern is formed, and daubed, on a participating player bingo card. If the participation-ending pattern is formed (only by a virtual player if the participation-ending pattern is identical to the game-ending pattern) at any moment during the game, the drawn numbers are only distributed when a game-ending pattern may be formed and daubed by a participating player.

In another embodiment, the daubing of the card is only necessary, and invited, if the distributed numbers allow the participating player to form one of the patterns (winning, ending or participation-ending). Thus, even if new numbers are distributed, the player does not have to daub if no pattern is formed using these new numbers. These numbers will be daubed if in a subsequent distribution, the new numbers, paired with the already daubed and still non-daubed numbers, allow to form a winning, ending or participation-ending pattern.

Those skilled in the art may recognize other embodiments and/or methods to provide such functionalities. It will be noted that the described embodiments illustrate different characteristics the invention may present. Those skilled in the art will recognize that, even if the instant embodiments describe these characteristics as part of different devices, one could differently use or combine some of these characteristics without departing from the scope of the invention as intended to be set. Furthermore, non-described embodiments may also present other characteristics and/or variations, with such characteristics falling within the scope of the invention, as set forth in the appended claims.

Thus, it is the intent through the instant document to efficiently teach the invention through embodiments, while defining the scope of the invention solely through the appended claims.

The invention claimed is:

1. A method of conducting a game of bingo on a bingo server and a plurality of player stations, comprising:

conducting on the plurality of player stations an enrolment process in which at least one player enrolls to participate in said bingo game, said bingo game having at least a game-ending pattern and a participation-ending pattern, said game-ending pattern being either identical or different from said participation-ending pattern;

evaluating on the bingo server a number of players having enrolled in view of a minimal number of players in a team of players with said number of players having enrolled being lower than said minimum number of players;

when said number of players having enrolled is lower than said minimal number of players, generating on the bingo server at least one virtual player to add to said team of players to complete size of said team of players to said minimal number of players;

registering, on both the bingo server and on each of the plurality of player stations at least one bingo card bearing indicia for each player or virtual player in said team of players, each of said at least one bingo card being unique;

on the bingo server, drawing bingo indicia;

comparing said drawn bingo indicia to said bingo cards registered in association with each of said player or virtual player of said team of players;

when said participation-ending pattern is formed on a bingo card registered in said bingo game, ending a process of distributing participation prizes regardless of whether the player associated with the bingo card on which is formed said participation-ending pattern is a virtual player or not;

when a game-ending pattern is formed on a bingo card registered in said bingo game, evaluating on the bingo server whether said bingo card is associated with a player or a virtual player; and upon evaluation that the winner is a virtual player, disregarding said game-ending pattern being formed, thereby continuing a process of establishing a winning player of said bingo game.

2. The method of claim 1, further comprising awarding a participation prize to a player when a winning pattern is formed on a bingo card.

3. The method of claim 1, further comprising awarding a prize to said winning player for forming said game-ending pattern.

4. The method of claim 1, wherein the step of drawing bingo indicia comprises drawing said bingo indicia all at the same time.

5. The method of claim 1, wherein the step of drawing bingo indicia comprises drawing said bingo indicia in sets,

6. The method of claim 5, wherein said sets all comprise the same number of bingo indicia.

7. The method of claim 5, wherein at least one of said sets comprises one bingo indicia.

8. The method of claim 1, further comprising distributing said bingo indicia to at least one player station.

9. The method of claim 8, wherein the step of distributing comprises distributing said bingo indicia in sets.

10. The method of claim 9, wherein said sets all comprise the same number of bingo indicia.

11. The method of claim 9, wherein at least one of said sets comprise one bingo indicia.

12. The method of claim 1, wherein the step of comparing comprises daubing said bingo card when an indicium on said bingo card match a drawn bingo indicium.

13. The method of claim 12, wherein the step of daubing comprises receiving player input regarding said daubing.

14. The method of claim 1, further comprising receiving a player input regarding a bingo game parameter selection.

15. The method of claim 1, further comprising ending said bingo game only when both of (i) said participation-ending pattern is formed on one bingo card registered in said bingo game, and (ii) the game-ending pattern is formed on one bingo card registered in said bingo game in association with a player being not a virtual player.

16. The method of claim 1, wherein said participation-ending pattern and said game-ending pattern are identical, and wherein said game extends over said game-ending pattern being formed on a bingo card registered in said bingo game when said bingo card forming said game-ending pattern is registered in association with a virtual player.

17. The methods of claim 1, wherein said process of distributing participation prizes comprises comparing patterns formed on bingo cards with winning patterns, wherein at least one of said winning patterns is different from said game-ending pattern and said participation-ending pattern.

18. The method of claim 1, wherein upon evaluation that the winner is a player, determining a potential winning player of said bingo game, and ending the drawing of bingo indicia.

19. A method of conducting a game of bingo on a bingo server and a plurality of player stations, comprising:

conducting on the plurality of player stations an enrolment process in which a group of at least one virtual player and at least one non-virtual player participate, the bingo game comprising a game ending pattern and a participation ending pattern;

registering, on both the bingo server and on each of the plurality of player stations, at least one bingo card bearing indicia for each of said at least one non-virtual player and at least one bingo card bearing indicial for each of the at least one virtual player, each of said at least one bingo card being unique;

on the bingo server, drawing bingo indicia;

comparing said drawn bingo indicia to said bingo cards registered in association with each of the players participating in the bingo game;

ending a process of distributing participation prizes to players based on said step of comparing when said participation-ending pattern is formed on a bingo card registered in said bingo game; and continuing a process of establishing a winning player of said bingo game when a game-ending pattern is formed on a bingo card registered in association with a virtual player in said bingo game.

20. The method of claim 19, further comprising awarding a participation prize to a player when a winning pattern is formed on a bingo card.

21. The method of claim 20, further comprising awarding a prize to said winning player for forming said game-ending pattern.

22. The method of claim 19, wherein the step of drawing bingo indicia comprises drawing said bingo indicia all at the same time.

23. The method of claim 19, wherein the step of drawing bingo indicia comprises drawing said bingo indicia in sets.

24. The method of claim 23, wherein said sets all comprise the same number of bingo indicia.

25. The method of claim 23, wherein at least one of said sets comprise one bingo indicia.

26. The method of claim 19, further comprising distributing said bingo indicia to at least one player station.

27. The method of claim 26, wherein the step of distributing comprises distributing said bingo indicia in sets.

28. The method of claim 27, wherein said sets all comprise the same number of bingo indicia.

29. The method of claim 27, wherein at least one of said sets comprise one bingo indicia.

30. The method of claim 19, wherein the step of comparing comprises daubing said bingo card when an indicium on said bingo card matches a drawn bingo indicium.

31. The method of claim 30, wherein the step of daubing comprises receiving player input regarding said daubing.

32. The method of claim 19, further comprising receiving a player input regarding a bingo game parameter selection.

33. The method of claim 19, further comprising ending said bingo game only when both of (i) said participation-ending pattern is formed on one bingo card registered in said bingo game, and (ii) the game-ending pattern is formed on one bingo card registered in said bingo game in association with a player being not a virtual player.

34. The method of claim 19, wherein said participation-ending pattern and said game-ending pattern are identical, and wherein said game extends over said game-ending pattern being formed on a bingo card registered in said bingo game when said bingo card forming said game-ending pattern is registered in association with a virtual player.

35. The methods of claim 19, wherein said process of distributing participation prizes comprises comparing patterns formed on bingo cards with winning patterns, wherein at least one of said winning patterns is different from said game-ending pattern and said participation-ending pattern.

36. The method of claim 19, wherein the process of establishing a winning player ends when the game-ending pattern is formed on a bingo card registered in association with a non-virtual player in said bingo game, said non-virtual player being determined a potential winning player of said bingo game.

37. A computer program embodied on a non-transitory computer readable medium or in a processor-readable memory having codes adapted to:

conduct an enrolment process in which at least one player enrolls to participate in a bingo game, said bingo game being having at least a game-ending pattern and a participation-ending pattern to be completed, said game-ending pattern being either identical or different from said participation-ending pattern;

evaluate a number of players having enrolled in view of a minimal number of players in a team of players with said number of players having enrolled being lower than said minimum number of players;

when said number of players having enrolled is lower than said minimal number of players, generate at least one virtual player to add to said team of players to complete size of said team of players to said minimal number of players;

register at least one bingo card bearing indicia for each player or virtual player in said team of players, each of said at least one bingo card being unique;

draw bingo indicia;

compare said drawn bingo indicia to said bingo cards registered in association with each of said player or virtual player of said team of players;

when said participation-ending pattern is formed on a bingo card registered in said bingo game, ending a process of distributing participation prizes regardless of whether the player associated with the bingo card on which is formed said participation-ending pattern is a virtual player or not;

when a game-ending pattern is formed on a bingo card registered in said bingo game, evaluating whether said bingo card is associated with a player or a virtual player; and upon evaluation that the winner is a virtual player, disregarding said game-ending pattern being formed, thereby continuing process of establishing a winning player of said bingo game.

* * * * *